United States Patent Office 3,767,699
Patented Oct. 23, 1973

3,767,699
META-UREIDOPHENOXYALKYL CARBAMATES
James A. Albright, St. Louis, Mich., and Kenneth P. Dorschner, Jacksonville, Fla., assignors to SCM Corporation, Cleveland, Ohio
No Drawing. Filed Aug. 15, 1972, Ser. No. 280,832
Int. Cl. C07c 125/06
U.S. Cl. 260—482 C  5 Claims

ABSTRACT OF THE DISCLOSURE

Novel meta-(3-alkylated)ureidophenoxyalkyl N-alkylcarbamates are shown to have valuable herbicidal activity.

BACKGROUND OF THE INVENTION

This invention relates to a new class of meta-ureidophenoxyalkyl carbamates, herbicidal compositions containing same, and a process for protecting valuable crop plants and grasses from undesirable weed species.

Numerous ureido-substituted phenyl carbamates, typified by U.S. Pat. 3,434,822, are known as soil sterilants of herbicides in the control of plant growth. The relevant art known to the applicants is listed in the attached Form PO-1088.

Surprisingly, it has been found that by inserting an oxyalkyl group between the phenyl ring and the carbamate portion of the above-mentioned carbamates, selective herbicides result which kill or stunt the growth of weeds in a germinating or growing crop without harming the valuable plant crop.

Summary of the invention

One aspect of this invention is a meta-(substituted ureido)phenoxyalkyl carbamate wherein said phenoxyalkyl moiety contains 7–12 carbon atoms, at least one of the hydrogen atoms attached to the carbamate nitrogen atom is replaced with a lower alkyl, lower hydroxyalkyl, or halogenated lower alkyl radical; the ureido nitrogen atom joined to the phenyl nucleus is unmethylated or methylated; and the ureido nitrogen in the 3 position of the ureido moiety is substituted with at least one lower alkyl, lower hydroxyalkyl or lower alkoxy radical.

Another aspect of this invention is a herbicidal composition comprising about 1 to about 98 percent of such phenoxyalkyl carbamate and an agriculturally acceptable carrier therefor.

Still another aspect of this invention is a process for controlling growth of vegetation which comprises applying to the locus of such vegetation such phenoxyalkyl carbamate at the rate of 0.5–25 pounds per acre.

The subject compound can be depicted structurally as follows:

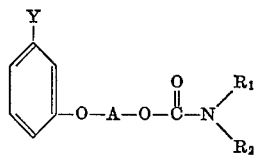

where

A is a $C_{1-}$ alkylene radical,
$R_1$ is a $C_{1-6}$ lower alkyl or lower hydroxyalkyl radical,
$R_2$ is hydrogen, or a $C_{1-6}$ lower alkyl or hydroxyalkyl radical, and
Y is a substituted ureido radical selected from the group consisting of: 3,3-di(lower)alkylureido, a 3-(lower)alkoxy-3-(lower)alkyl ureido, or a 3-(lower)alkylureido radical;

and their 1-methyl and 1-ethyl counterparts.

In general, the alkylene group "A" of the above-described phenoxyalkyl carbamate advantageously is a methylene, ethylene, or propylene group. For efficiency and economy of preparation and herbicidal use, the propylene group is preferred although various other normal and isomeric alkylene materials also are economically attractive. $R_1$ is preferably an ethyl or tert-butyl radical, $R_2$ is hydrogen and Y is a 3,3-di(lower)alkylureido radical (preferably the 3,3-dimethylureido radical). It is, of course, within the skill of the art to use in place of the alkylene group in "A," allyl and like stable hydrocarbyl groups; in place of the aliphatic $R_1$ groups, haloalkyl, alkenyl, haloalkenyl, cycloalkyl, straight phenyl and phenyl as commonly ring-substituted with halogen, nitro and alkyl groups. It is also contemplated that $R_1$ and $R_2$, when taken together with the carbamate nitrogen, can form a heterocyclic ring containing 5 or 6 atoms such as, for example, piperidine and morpholine.

Surprisingly, the novel compounds of this invention have been found to selectively control undesired weeds when used as pre-plant, pre-emergent and post-emergent herbicides for crop plants, in contrast to the general herbicide and soil sterilant properties of the analogs described in U.S. Pat. 3,434,822.

The carbamates of this invention are very effective and selective in eliminating and controlling weeds including mustard (Brassica spp.), coffee weed (Sesbania spp.), pig weed (Amaranthus spp.), crab grass (Digitaria spp.), barnyard grass (Echinochloa spp.), giant foxtail (Setaria spp.), annual morning glory (Ipomoea spp.), Texas panicum (*Panicum texanum*), and the like without significant injury to the specific crops, for example, rice, corn, cotton, lima beans and soybean.

Application dosages of these herbicides, based on the active ingredient, suitably can be fairly high, but for economy generally are about 15 pounds per acre or below, advantageously not more than about 8 pounds per acre, and generally 0.5–8 pounds per acre, although dosages as high as 40 pounds per acre can be used.

By crop plants is meant not only agricultural crops which are used for food supply of man and animals, but also other desirable plants such as grass and lawn grass species where broad leaf and other undesirable weeds are to be controlled, suppressed or eradicated.

Conventional formulations can be used to apply these herbicides using agriculturally acceptable carriers which are inert towards the phenoxyalkyl carbamates and not harmful to the operator or the environment of the plant. Hence, intermediates, unreacted excess reactants or reagents, by-products of reaction and solvents containing such extraneous chemical material definitely are not a part of the inventive compositions, the latter whose active ingredients should be fairly commercially pure compounds, e.g., 85% purity or higher with only innocuous diluents admixed with them.

Application as wettable powders dispersed in an aqueous medium are preferred when the ureido-carbamate is relatively insoluble in the application solvent. Wettable powders can be formulated from inert carriers such as clays, talc, diatomaceous earth and other siliceous inorganic solids and silicates. Although the wettable powder can contain any proportion of active herbicides from about 1 to 98 percent, it is generally more economically feasible to use a high loading of active selective herbicide material. Active ingredient concentrations of 50-90 percent, based on weight of inert carrier, are recommended, and concentrations roughly of 80 weight percent active ingredient are preferred. It is desirable that both the inert carrier and herbicide, if solids, be ball-milled or ground by other common techniques to a very fine state of subdivision so that they will pass through a 325-mesh screen (U.S. Standard Sieve).

The formulation can contain various other agents to wet, disperse and emulsify the herbicidal composition whether or not a solvent is used in the application to the locus of the plant or to the soil. The surfactants or other detergents employed can be anionic, nonionic or cationic as are detailed in McCutcheons 1969 publication on Detergents and Emulsifiers. Surfactants useful in formulation of our selective herbicides are usually added in amounts of 1 to 10 percent based on the total weight of wettable powder formulation but, generally, in the order of 2 percent. These can be alkyl and alkylaryl polyether alcohols, polyoxyethylene sorbitols or sorbitan fatty acid esters, alkylaryl sulfonates, long chain quaternary ammonium chlorides and the like.

Water emulsions may be prepared with the aid of emulsifiers such as triethanolamine stearate, sodium lauryl sulfonate, sodium alkyl naphthalene sulfonate, sodium oleate, p-t-octylphenoxypolyethoxy ethanol as well as other well known emulsifiers.

The characteristic of a good selective herbicide is that when it is applied near or on the foliage of the crop plant only the weed species is killed while the valuable crop plants are not harmed beyond the point of recovery, thus allowing a high percentage (85-100 percent) to mature to harvestable crops.

SYNTHESIS

The ureidophenoxyalkyl carbamates of this invention can be synthesized by modification of known techniques for the preparation of ureidophenyl N-alkylcarbamates. Preferable starting materials are the meta-aminophenoxyalkanols such as meta-aminophenoxymethanol, meta-aminophenoxyethanol, meta-aminophenoxypropanol and the like which generally can be obtained by reduction of the corresponding nitro analogues. Generally, the meta-aminophenoxyalkanol is first reacted with N,N-dialkyl carbamoyl chloride to form the meta-(substituted ureido)phenoxyalkanol which is further treated with an isocyanate to yield the carbamates of this invention. In many cases the products are solids which can be conveniently purified by fractional crystallization.

The following examples are intended to illustrate the invention, but not to limit the scope thereof. Parts and percentages are by weight unless otherwise indicated.

EXAMPLE 1

3-(m-hydroxyphenyl)-1,1-dimethylurea

Dimethyl carbamoyl chloride (20 grams) was added dropwise to a magnetically stirred solution of meta-aminophenol (20 grams) and triethylamine (19 grams) in 100 ml. of dioxane. The reaction mixture was stirred for 24 hours at room temperature. The solvent was removed by distillation under vacuum and the resulting oil stirred into 100 ml. of water. The solid which formed was filtered off and recrystallized to give 3-(m-hydroxyphenyl)-1,1-dimethylurea.

EXAMPLE 2

3-[meta(3',3'-dimethylureido)phenoxy]propanol-1

To 36 grams (0.2 mol 3-(m-hydroxyphenyl)-1,1-dimethylurea in 500 ml. anhydrous methanol was added 12 grams (0.22 mol) powdered sodium methoxide. After stirring for one half hour at room temperature 28 grams 3-bromopropanol dissolved in 125 ml. methanol was added dropwise with stirring and then the reaction mixture was heated at reflux for 1½ hours. After cooling and filtering off the sodium bromide, crude solid 3-[meta-(3',3'-dimethylureido)phenoxy]propanol-1 was isolated in 99 percent yield by evaporation of the methanol. The structure of the product was verified by infrared spectroscopy.

EXAMPLE 3

3-[meta-(3',3'-dimethylureido)phenoxy]propyl N-ethylcarbamate

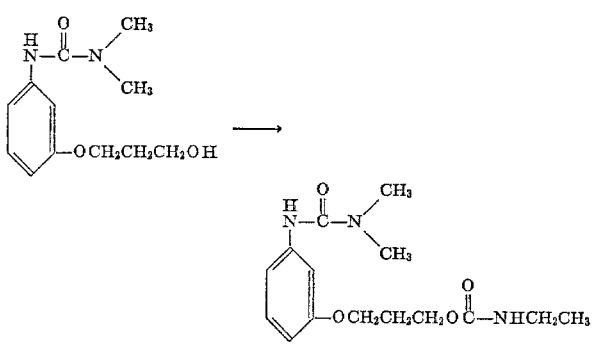

A mixture of 15 grams (0.06 mol) crude 3-[m-(3,3-dimethylureido)phenoxy]propanol, 5 grams (0.07 mol) of ethyl isocyanate and 1 ml. dibutyltin diacetate were stirred together in 600 ml. benzene. An exothermic reaction developed and the mixture was stirred for 2 hours before isolating the resulting solid. After washing with fresh benzene the product carbamate was obtained as a white solid, M.P. 110-115° C.

EXAMPLE 4

3-[meta - (3',3' - dimethylureido)phenoxy]propyl N-methylcarbamate was prepared in a manner similar to the procedure of Example 3 except that methyl isocyanate was used in place of ethyl isocyanate. The product was obtained as a white solid, M.P. 142-145° C. The structure was verified by infrared spectroscopy.

EXAMPLE 5

3-[meta - (3',3' - dimethylureido)phenoxy]propyl N-(tertbutyl)carbamate was prepared in a manner similar to the procedure of Example 3 except that tert-butyl isocyanate was used in place of ethyl isocyanate. The product was obtained in 33 percent yield as a tan solid, M.P. 98–102° C.

EXAMPLE 6

3 - [meta - (3',3' - dimethylureido)phenoxy]propyl N-(n-butyl) carbamate was prepared in a manner similar to the procedure of Example 3 except n-butyl isocyanate was used in place of ethyl isocyanate. The product was obtained in 30 percent yield as a tan solid, M.P. 120–112° C.

EXAMPLE 7

3 - [meta - (3',3' - dimethylureido)phenoxy]propyl N-(2-propyl)carbamate, prepared according to the general procedure described above, was obtained in 31 percent yield and had M.P. of 85–88° C.

EXAMPLE 8

3 - [meta - (3',3' - dimethylureido)phenoxy]propyl N-(2-chloroethyl)carbamate, prepared according to the general procedure described above, was obtained in 33 percent yield as a white solid, M.P. 134–135° C.

EXAMPLE 9

3 - [meta - (3',3' - dimethylureido)phenoxy]propyl N-allylcarbamate, prepared according to the general procedure described above, was obtained in 25 percent yield as a white solid, M.P. 105–108° C.

EXAMPLE 10

3 - [meta - (3',3' - dimethylureido)phenoxy]propyl N-(m-tolyl)carbamate, prepared according to the general procedure described above, was obtained in 50 percent yield as a white solid, M.P. 104–106° C.

EXAMPLE 11

Each experimental candidate pesticide was formulated to assure substantially uniform broadcast of 8.0 pounds active ingredient (candidate) per acre. The resulting compositions were then evaluated as pre-emergence, post-emergence and as soil-incorporated herbicides.

In pre-emergence herbicidal testing, typical crop plant and weed species were seeded in individual disposable four-inch square containers, watered in amounts adequate to moisten soil and held for 24 hours before treatment. Candidate chemicals were then applied to the soil surface of flats, taking care to assure that no seedlings had emerged from the soil before chemical treatment.

In post-emergence herbicidal testing, appropriate crop plant and weed species were seeded by growth-time requirement schedules in individual disposable four-inch square containers, watered as required and maintained under greenhouse conditions. When all crop plants and weeds had reached suitable growth development, generally, first true leaf stage of the slowest plants, weeds appropriate to pertaining test requirements were selected for uniformity of growth and development. A four-inch container of each plant and weed, averaging six (corn) to fifty (crabgrass) or more plants or weeds per individual container, was then placed on carrying tray for treatment. Ordinarily, six crop and six weed containers were used in each evaluation.

Soil-incorporation is primarily an attempt to reduce loss of chemical by volatility and/or solar degradation. In this screening program soil-incorporation was accomplished by application of the chemical to exposed seeds before covering with fresh untreated soil.

Candidate compositions were dissolved in acetone and diluted with water.

One carrying tray each of pre-emergence (six crops and six weeds) and post-emergence (six crops and six weeds) containers mounted on a conveyor belt of 1.5 m.p.h. linear speed tripped a miscroswitch which, in turn, activated a solenoid valve and released treatment. Candidate compounds were discharged with pressure as sprays. The treated trays were removed to the greenhouse and held for observation.

Reference standards, sterile flats and untreated controls received similar care and handling.

Pre-emergence and post-emergence treatments were observed daily for interim response, final observations being made fourteen days after treatment. Any treatments including questionable response were held beyond the fourteen-day observation period until such responses were confirmed.

Observations included all abnormal physiological responses of stem bending, petiole curvature, epinasty, hyponasty, retardation, stimulation, root development, necrosis and related growth regulant characteristics.

Evaluation of the herbicidal performance of the experimental compounds was made by comparison of plant stands in the treatment with those found in untreated controls, sterile flats and those containing the control compound.

Where complete kill (100% control) of a plant species was not obtained, herbicidal performance is indicated by two methods. The first is a numerical rating 0 to 100 and represents percent of the plant actually killed at the time of observation. A second indication of herbicidal performance was a vigor rating (a to d) indicated in the tables as exponents which indicates the general health and appearance of the plants after the chemical treatment. The vigor ratings are as follows:

(a) Severe injury—plants will eventually die.
(b) Moderate injury—plants may or may not recover.
(c) Moderate injury—plants will recover.
(d) Slight injury—plants only slightly behind control.
No exponent—no injury—plants similar to untreated control.

Thus, a chemical having a rating of $0^a$ on barnyard grass is nearly as effective as another chemical providing 100% kill of this weed. In the table where there was no plant injury, the rating 0 with no exponent is recorded. Where the percent kill was 50 percent or below, the appropriate exponent indicating plant injury was used. Where the percent kill exceeded 50 percent no such exponent rating is shown.

Table I summarizes the herbicidal activity of various 3-[meta - (3',3' - dimethylureido)phenoxy]propyl carbamates. Surprisingly, these carbamates are very effective as pre-emergence, post-emergence and soil-incorporated herbicides when applied at 8 pounds active ingredient per acre. At this loading the selectivity of the compounds of this invention become noticeable when comparison is made with prior art carbamates such as the Standard, "Tandex," tested at the same broadcast rate.

Curiously, as noted in Table I, considerable variation results when the alkyl group on the carbamate nitrogen is changed. When such groups are alkyl, isopropyl and normal-butyl groups, selectivity towards lima beans, corn, cotton and rice results only when the phenoxyalkyl carbamates are applied as post-emergent treatments. When the carbamate nitrogen is substituted with a 2-chloroethyl or a meta-tolyl radical even the post-emergence activity is diminishd.

One of the most active compounds of the present carbamates is the compound of Example 5, 3-[meta-(3',3'-dimethyluredio)phenoxy]propyl N-(tert-butyl)carbamate. The broad and increased activity of this herbicide as compared with its n-butyl homolog (compound of Example 6) is remarkable. Nevertheless, the latter compound has excellent selectivity for corn, rice and lima beans when applied as a post-emergence herbicide.

TABLE I.—HERBICIDAL ACTIVITY OF META-UREIDOPHENOXYALKYL CARBAMATES

| Compound | Application lbs./acre | Type | Mustard | Lima beans | Soybean | Coffeeweed | Rice | Pigweed | Corn | Crabgrass | Cotton | Barnyard grass | Dallis grass |
|---|---|---|---|---|---|---|---|---|---|---|---|---|---|
| Compound of Example 4 | 8 | Pre | 25(c) | | 50(b) | 100 | 0(d) | 100 | 0(c) | 25(d) | 100 | 10(c) | |
|  | 8 | Post | 100 | | 100 | 100 | 80(d) | 100 | 60(c) | 100 | 100 | 100 | |
|  |  | S.I. | | | | | | | | | | | |
| Compound of Example 3 | 8 | Pre | 100 | | 100 | 100 | 0(d) | 100 | 100 | 100 | 100 | 100 | |
|  | 8 | Post | 100 | | 100 | 100 | 0 | 100 | 50(c) | 90(c) | 100 | | |
|  | 8 | S.I. | 100 | | 100 | 100 | 100 | 100 | 80(b) | 10(c) | 100 | | |
| Compound of Example 5 | 8 | Pre | 100 | | 25(b) | 100 | 0(d) | 100 | 20(c) | 100 | 20(c) | | 100 |
|  | 8 | Post | 100 | | 100 | 100 | 15(c) | 100 | 90 | 100 | 100 | | 100 |
|  | 8 | S.I. | 100 | | 100 | 100 | 100 | 100 | 100 | 100 | 100 | | 100 |
| Compound of Example 6 | 8 | Pre | | 0 | | 0 | 0 | 0 | 0 | 0 | 0 | 0 | |
|  | 8 | Post | 100 | 0(c) | | 100 | 0 | 25(c) | 0 | 25(c) | 100 | 0 | |
|  | 8 | S.I. | 0 | 0 | | 0 | 0 | 0 | 0 | 0 | 0 | 0 | |
| 3-[meta-(3',3'-dimethyl-ureido phenoxy]propyl N-(ethyl-carbamate). | 8 | Pre | 0 | | 0 | 100 | 0 | 100 | 0 | 0(d) | 0 | | 0 |
|  | 8 | Post | 100 | | 0 | 100 | 0 | 100 | 0 | 0 | 0 | | |
|  | 8 | S.I. | 0 | | 0 | 100 | 0 | 0(c) | 0 | 0(d) | 0 | | 0 |
| Compound of Example 8 | 8 | Pre | 0 | 0 | | 0 | 0 | 0 | 0 | 0 | 0 | 0 | |
|  | 8 | Post | 100 | 0 | | 0 | 0 | 50(d) | 0 | 0 | 0 | 0 | |
|  | 8 | S.I. | 0 | 0 | | 0 | 0 | 0 | 0 | 0 | 0 | 0 | |
| Compound of Example 7 | 8 | Pre | 0(d) | 0 | | 0(d) | 0 | 0 | 0 | 0 | 0 | 0 | |
|  | 8 | Post | 100 | 50(d) | | 100 | 0(c) | 100 | 0(d) | 100 | 100 | 0(d) | |
|  | 8 | S.I. | 60(c) | 80 | | 100 | 0(d) | 30(c) | 0(c) | 0(c) | 0 | 0 | |
| Compound of Example 9 | 8 | Pre | 0 | 0 | | 0 | 0 | 0 | 0 | 0 | 0 | 0 | |
|  | 8 | Post | 100 | 0 | | 100 | 0 | 100 | 0(d) | 100 | 100 | 65(c) | |
|  | 8 | S.I. | 15(c) | 25(c) | | 80(d) | 0 | 0(d) | 0 | 0(d) | 0 | 0 | |
| Compound of Example 10 | 8 | Pre | 0 | 0 | | 0 | 0 | 0 | 0 | 0 | 0 | 0 | |
|  | 8 | Post | 100 | 0 | | 100 | 0 | 30(d) | 0 | 0 | 0 | 0 | |
|  | 8 | S.I. | 0 | 0 | | 0 | 0 | 0 | 0 | 0 | 0 | 0 | |
| m-(3,3-dimethyl-ureido)phenyl N-(tert-butyl) carbamate (standard.) | 8 | Pre | 100 | | 100 | 100 | 100 | 100 | 100 | 100 | 100 | 100 | 100 |
|  | 8 | Pre | 100 | | 100 | 100 | 100 | 100 | 100 | 100 | 100 | 100 | 100 |
|  | 8 | S.I. | 100 | | 100 | 100 | 100 | 100 | 100 | 100 | 100 | 100 | 100 |

Vigor ratings;
(a) severe injury—plants will eventually die.
(b) moderate injury—plants may or may not recover.
(c) moderate injury—plants will recover.
(d) slight injury—plants only slightly behind control.
No exponent—plants similar to untreated control.

EXAMPLE 12

The selectivity of the compounds of this invention becomes more apparent when comparison is made with the standard at lower application rates (6.0, 4.0 and 2.0 pounds per acre). In particular, the compound of Example 5, 3 - [meta-(3',3'-dimethylureido)phenoxy]propyl N-(tert-butyl)carbamate exhibits high selectivity for the crop plants of soybean, rice, corn and cotton as opposed to the essentially non-selectivity of the standard carbamate ("Tandex"). This selectivity as a pre-emergence herbicide is shown in Table II.

Similar superior selectivity was demonstrated when 3-[meta - (3',3' - dimethylureido)phenoxy]propyl N-(tert-butyl) carbamate was tested as a post-emergence and as a soil-incorporated herbicide at application rates of 6.0, 4.0, 2.0 and 1.0 pounds per acre.

EXAMPLE 13

The compound of Example 5 was tested as a post-emergence herbicide to protect the peanut plant from the undesired weeds, mustard, coffeeweed, crabgrass and barnyard grass. Complete control (100% kill) of crabgrass, mustard and coffeeweed and substantial control (75% kill) of barnyard grass was obtained at an application rate of 4.0 pounds per acre without harm to the peanut plants.

The compound of Example 5 when tested as a pre-emergence herbicide was almost as effective against mustard and coffeeweed but considerably less effective against crabgrass and barnyard grass.

TABLE II.—RESPONSE OF TEST PLANTS TO PRE-EMERGENCE CHEMICAL TREATMENTS

| | Compound of Example 5 | | | Standard[1] | | | |
|---|---|---|---|---|---|---|---|
| Application rates, pounds per acre | 6.0 | 4.0 | 2.0 | 6.0 | 4.0 | 2.0 | 1.0 |
| Plant species: | | | | | | | |
| Mustard | 50 (c) | 0 (d) | 0 | 100 | 100 | 100 | 0 (c) |
| Soybean | 0 (c) | 0 (d) | 0 | 100 | 100 | 80 | 80 |
| Coffeeweed | 100 | 100 | 50 (c) | 100 | 100 | 100 | 50 (b) |
| Rice | 10 (c) | 0 (d) | 0 | 100 | 100 | 100 | 100 |
| Pigweed | 100 | 100 | 100 | 100 | 100 | 100 | 100 |
| Corn | 75 | 0 (c) | 0 | 100 | 100 | 100 | 100 |
| Crabgrass | 100 | 100 | 50 (c) | 100 | 100 | 100 | 100 |
| Cotton | 0 (c) | 0 (d) | 0 | 100 | 100 | 100 | 100 |
| Dallis grass | 100 | 100 | 0 (c) | 100 | 100 | 100 | 100 |

[1] m-(3,3-dimethylureido)phenyl N-(tert-butyl)carbamate ("Tandex").

Vigor rating:
(a) severe injury—plants will eventually die.
(b) moderate injury—plants may or may not recover.
(c) moderate injury—plants will recover.
(d) slight injury—plants only slightly behind control.
No exponent—no injury, plants similar to untreated control.

Having thus described the invention, what is claimed is:

1. A meta-(substituted ureido)phenoxyalkyl carbamate wherein: said phenoxyalkyl moiety contains 7–12 carbon atoms; at least one of the hydrogen atoms attached to the carbamate nitrogen atom is replaced with a lower alkyl, lower hydroxyalkyl, or halogenated lower alkyl radical; the ureido nitrogen atom joined to the phenyl nucleus is unmethylated or methylated; and the ureido nitrogen in the 3 position of the ureido moiety is substituted with at least one lower alkyl, lower hydroxyalkyl or lower alkoxy radical.

2. The carbamate of claim 1 wherein said phenoxyalkyl moiety is a phenoxymethyl, a phenoxyethyl, a phenoxypropyl, or a phenoxybutyl radical including isomeric phenoxypropyl and phenoxybutyl radicals; the ureido nitrogen joined to the phenyl nucleus is unmethylated, and the ureido nitrogen in the 3 position of the uredio moiety is dimethylated.

3. 3 - [(3',3' - dimethylureido)phenoxy]propyl N-ethylcarbamate.

4. 3 - [m - (3',3' - dimethylureido)phenoxy]propyl N-methylcarbamate.

5. 3 - [m - 3',3' - dimethylureido)phenoxy]propyl N-(tert-butyl)carbamate.

References Cited
UNITED STATES PATENTS

| 3,399,048 | 8/1968 | Herrett | 260—482 C |
| 3,434,822 | 5/1969 | Wilson | 260—479 C |

LORRAINE A. WEINBERGER, Primary Examiner

P. J. KILLOS, Assistant Examiner

U.S. Cl. X.R.

71—76, 88, 94, 106; 260—247.2 B, 293.74, 468 E, 471 C, 553 A

UNITED STATES PATENT OFFICE
CERTIFICATE OF CORRECTION

Patent No. 3,767,699     Dated  Oct. 23, 1973

Inventor(s)  James A. Albright, Kenneth P. Dorschner

It is certified that error appears in the above-identified patent and that said Letters Patent are hereby corrected as shown below:

Column 2, line 2, correct "$C_{1-}$" to read: "$C_{1-6}$".

Column 6, line 14, correct "including" to read: "inducing".

Column 6, line 70, correct "methyluredio)phenoxy_/propyl" to read: "methylureido)phenoxy_/propyl".

Column 7, Table I, under column "Application - lbs./acre and Type" (second last line), correct "Pre" to read "Post".

Column 9, Claim 3, line 9, insert --m-- before "(3',3' - dimethylureido)phenoxy_/propyl".

Signed and sealed this 23rd day of July 1974.

(SEAL)
Attest:

McCOY M. GIBSON, JR.
Attesting Officer

C. MARSHALL DANN
Commissioner of Patents